United States Patent [19]

Demmin et al.

[11] Patent Number: 5,137,929
[45] Date of Patent: Aug. 11, 1992

[54] ADDITIVES WHICH STABILIZE HYDROHALOCARBON BLOWING AGENT IN POLYURETHANE AND POLYISOCYANURATE FOAM FORMULATIONS DURING POLYMERIZATION

[75] Inventors: Timothy R. Demmin, Grand Island; Richard E. Eibeck, Orchard Park; Gary M. Knopeck, Lakeview; Robert C. Parker, Hamburg; Donna M. Ruszaj, East Amherst, all of N.Y.; Stephen F. Yates, Arlington Heights; George D. Green, Park Ridge, both of Ill.; Keith A. Horn, Long Valley; Willis Hammond, Chatham, both of N.J.; Raymond H. P. Thomas, Amherst, N.Y.

[73] Assignee: Allied-Signal Inc., Morris Township, Morris County, Del.

[21] Appl. No.: 718,722

[22] Filed: Jun. 21, 1991

[51] Int. Cl.$^5$ ............................................. C08G 18/14
[52] U.S. Cl. ..................................... 521/99; 521/107; 521/117; 521/121; 521/122; 521/128; 521/130; 521/131; 521/132; 252/68; 252/182.24; 252/182.26; 252/182.27
[58] Field of Search ................ 521/99, 107, 117, 121, 521/122, 128, 130, 131, 132; 252/68, 182.24, 182.26, 182.27

[56] References Cited

U.S. PATENT DOCUMENTS 4,861,926 8/1989 Servais .................................. 570/110

FOREIGN PATENT DOCUMENTS 103843 5/1986 Japan .
2204424 8/1990 Japan .

*Primary Examiner*—Maurice J. Welsh
*Attorney, Agent, or Firm*—Melanie L. Brown; Jay P. Friedenson

[57] ABSTRACT

The present invention relates to foam compositions which are expanded with hydrohalocarbon blowing agents in the presence of additives which decrease the formation of haloalkenes during the polymerization. Thus, the present invention provides compositions comprising polyisocyanate, polyol, hydrohalocarbon blowing agent, catalyst, surfactant, and at least one additive wherein the additive is capable of decreasing the amount of decomposition of said dehydrohalocarbon blowing agent to haloalkenes during polymerization of the polyisocyanate and the polyol.

Depending upon the polyol and polyisocyanate used and the quantity of polyisocyanate used, the compositions may be used in pour-in-place molded foams; rigid urethane spray foams; rigid high and low density foams for slabstock, froth foams, and molded foams; rigid laminated boardstock; or specialty foams.

45 Claims, No Drawings

ADDITIVES WHICH STABILIZE HYDROHALOCARBON BLOWING AGENT IN POLYURETHANE AND POLYISOCYANURATE FOAM FORMULATIONS DURING POLYMERIZATION

The present invention relates to polyurethane and polyisocyanurate foam formulations in which the hydrohalocarbon blowing agent is stabilized during polymerization by the presence of additives.

BACKGROUND OF THE INVENTION

It is well known to those skilled in the art that low density rigid polyurethane and polyisocyanurate foams can be prepared by reacting and foaming a mixture of ingredients including an organic polyisocyanate (including diisocyanates) and an appropriate amount of polyol or mixture of polyols in the presence of a volatile liquid blowing agent, which is caused to vaporize by the heat liberated during the reaction of polyisocyanate and polyol. It is also well known that this reaction and foaming process require the use of amine and/or metal carboxylate catalysts as well as surfactants. The catalysts ensure adequate curing of the foam while the surfactants regulate and control cell size. The terms polyisocyanurate foams and polyurethane modified polyisocyanurate foams describe the same general class of rigid foams and are used interchangeably in the industry.

In the class of foams known as low density rigid polyurethane or polyisocyanurate foams, the blowing agent of choice has been trichlorofluoromethane (known in the art as CFC-11). These types of foams are closed-cell foams in which the CFC-11 vapor is encapsulated or trapped in the matrix of closed cells. They offer excellent thermal insulation due in part to the very low thermal conductivity of CFC-11 vapor and are used widely in insulation applications such as roofing systems, building panels, refrigerators, and freezers. Generally, about 1 to 60 parts by weight, and more specifically, about 15 to 40 parts by weight of blowing agent per 100 parts by weight polyol are used in rigid polyurethane or polyisocyanurate formulations.

Chlorofluorocarbons (known as CFCs) including CFC-11 are now suspected ozone depleting compounds which also contribute to the greenhouse warming effect in the atmosphere. Other chlorofluorocarbons suspected of possessing similar detrimental effects on the earth's atmosphere include dichlorodifluoromethane (known in the art as CFC-12) and 1,1,2-trichloro-1,2,2-trifluoroethane (known in the art as CFC-113). Based on the MONTREAL PROTOCOL ON SUBSTANCES THAT DEPLETE THE OZONE LAYER and the CLEAN AIR ACT, alternatives to CFC solvents, propellants, refrigerants, and blowing agents are being developed and commercialized rapidly.

Hydrochlorofluorocarbons (known as HCFCs) are viewed as acceptable alternatives to CFCs because they are inherently less chemically stable in the earth's atmosphere, and have lower ozone depletion potentials and greenhouse warming potentials than fully halogenated CFCs.

Certain hydrochlorofluorocarbons are known to be viable commercial alternatives to the chlorofluorocarbon blowing agent, CFC-11, currently being employed in the production of rigid polyurethane replacements for CFC-11 are 11-dichloro-1-fluoroethane (known in the art as HCFC-141b) and 1,1-dichloro-2,2,2-trifluoroethane (known in the art as HCFC-123) because they both possess key physical properties similar to CFC-11 including boiling point and thermal conductivity.

To ensure successful commercialization of these alternatives, it is necessary that they be chemically stable under required processing conditions and end uses. In particular, HCFCs are well known to undergo degradation by dehydrohalogenation reactions to form halogenated alkenes. Examples of such reactions are as follows:

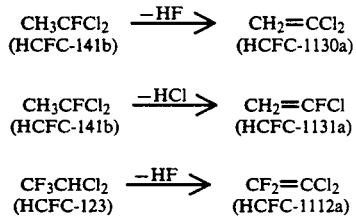

Many of these haloalkene products possess unknown properties and it is therefore desirable to hold their formation to a minimum as a precautionary measure.

Tests performed using the above hydrohalocarbons as blowing agents, in typical foam formulations now in commercial use, revealed that the haloalkenes can be found in the cells of the cured foam at concentrations up to about 10,000 parts/weight per million relative to the blowing agent.

Stabilizers have been added to hydrohalocarbons to inhibit or minimize the generation and buildup of degradation products. For example, U.S. Pat. No. 4,861,926 teaches that 1,1,1-trichloroethane can be stabilized with mixtures of epoxybutane, nitromethanes, 2-methylfuran, and methyl acetate in textile dry cleaning and metal degreasing applications. Kokai Patent Publication 103,843 published May 22, 1986 teaches that the addition of benzotriazole stabilizes 1,2-dichloro-1-fluoroethane when it is exposed to metallic surfaces in the presence of hydroxylic solvents, e.g. water or alcohols. The abstract of Japanese 2,204,424 published Aug. 14, 1990 teaches that hydrochlorofluoropropanes in the presence of steel are thermally stabilized by adding nitro compounds, phenols, amines, ethers, esters, epoxides, alcohols, ketones, or triazoles.

Specialized chemical additives are often present in low density rigid polyurethane and polyisocyanurate foams to enhance certain performance features of the foam e.g. flame retardants, antioxidants, and solubilizing surfactants. Such additives are dissolved in a formulation component or pre-mix prior to foam production. Flame retardants include halocarbons, e.g. chloroalkyl phosphate esters, polybromoalkanes, or polybromoaromatics. Antioxidants are typically phosphite esters. Solubilizing agents commonly used are ethoxylated nonylphenols.

We considered the use of additives to lower the concentration of volatile haloalkene degradation products generated in rigid polyurethane and polyurethane modified polyisocyanurate foam formulations blown with saturated hydrohalocarbons.

SUMMARY OF THE INVENTION

We have found that certain additives are capable of decreasing the amount of decomposition of the hydrohalocarbon blowing agent during polymerization of the polyisocyanates and the polyols. Thus, the present invention provides compositions comprising polyisocyanate, polyol, hydrohalocarbon blowing agent, catalyst for the polymerization of the polyisocyanate and the polyol, surfactant, and at least one additive wherein the at least one additive is capable of decreasing the amount of decomposition of the hydrohalocarbon blowing agent during polymerization of the polyisocyanate and the polyol.

The term "haloalkenes" as used herein means those organic materials having at least one double bond and at least one halogen atom therein. The haloalkenes which form depend on the hydrohalocarbon blowing agent used. For example, if the blowing agent is 1,1-dichloro-1-fluoroethane, the haloalkenes which may form include 1,1-dichloroethylene and 1-chloro-1-fluoroethylene. If the blowing agent is 1,1-dichloro-2,2,2-trifluoroethane, the haloalkene which may form is 1,1-dichloro-2,2-difluoroethylene.

Preferably, the use of selected additive is effective when the amount of haloalkenes formed by practice of the present invention is less than about 75% of the amount of haloalkenes formed in the absence of the present invention. Thus, if the amount of haloalkenes formed in the absence of the present invention is X, the amount of haloalkenes formed by the practice of the present invention is less than about (0.75)(X). More preferably, the amount of haloalkenes formed by practice of the present invention is less than about 50% of the amount of haloalkenes formed in the absence of the present invention. Thus, if the amount of haloalkenes formed in the absence of the present invention is X, the amount of haloalkenes formed by practice of the present invention is less than about (0.50)(X).

Other advantages of the present invention will become apparent from the following description.

DETAILED DESCRIPTION OF THE PREFERRED EMBODIMENTS

During the production of typical commercial rigid polyurethane and polyisocyanurate foams blown with 1,1-dichloro-1-fluoroethane, undesirable concentrations of 1-chloro-1-fluoroethylene may be generated by a dehydrochlorination side reaction. Unknown properties are associated with HCFC-1131a and other haloalkenes that may be co-generated in any HCFC blown polyurethane or polyisocyanurate foam wherein the blowing agent has at least two carbon atoms. Thus, the concentration of these halogenated alkenes must be reduced to the lowest possible levels during foam production.

The procedure of the present invention efficiently leads to reduced levels of haloalkenes, in particular, HCFC-1131a, in polyurethane and polyisocyanurate foam blown with HCFC-141b. The present invention involves adding a specific chemical compound to the given foam formulation. Although not wishing to be bound by theory, we believe that the dehydrohalogenation reactions are base initiated elimination reactions. The additives presumably interfere with the reactive dehydrohalogenating species so as to suppress haloalkene generation. Any chemical additive which interferes with the reactive dehydrohalogenating species so as to suppress haloalkene generation is useful in practicing the present invention.

The preferred types of chemical additives that result in a substantial reduction in the formation of haloalkenes during HCFC-141b blown foam production are: esters, organic acids, anhydrides, aminoacids, ammonium salts, bromoalkanes, bromoalcohols, bromoaromatic esters, chloroalcohols, nitroalkanes, nitroalcohols, triarylmethyl chlorides, triarylmethyl bromides, 3-sulfolene, zinc dialkyldithiophosphate (ZDTP), haloalkyl phosphate esters, carbon molecular sieves, powdered activated carbon, zeolite molecular sieves, sulfonate esters, and haloalkyl phosphate esters. It is believed that hydroxyl, carboxyl, and unsubstituted amino functionality in any of the additives ultimately react with polyisocyanate thus incorporating the additive within the polymer framework.

Preferred esters include trihaloethyl esters of the formula $RCO_2—CH_2—CX_3$ where R is selected from the group consisting of hydrogen, alkyl having 1 to 18 carbon atoms, cycloalkyl, substituted alkyl, aryl, and substituted aryl and X is Cl or Br. Examples include 2,2,2-trichloroethyl formate; 2,2,2-trichloroethyl benzoate; 2,2,2-trichloroethyl 3-hydroxypropanoate; 2,2,2-tribromoethyl acetate; 2,2,2-tribromoethyl 2-ethylhexanoate; and 2,2,2-tribromoethyl 4-methylbenzoate. Other preferred esters are of the formula $CX_3—CO_2R'$ where R' is selected from the group consisting of alkyl having 1 to 18 carbon atoms, cycloalkyl, substituted alkyl, aryl, and substituted aryl and X is Cl or Br. Examples include phenyl trichloroacetate; methyl trichloroacetate; 2-propyl tribromoacetate; and benzyl tribromoacetate.

Preferred organic acids are either of the formula $R^1R^2R^3 C—CO_2H$ where $R^1$, $R^2$, and $R^3$ are the same or different and selected from hydrogen, linear or branched alkyl, hydroxyalkyl, cycloalkyl with alkyl groups containing 1 to 18 carbon atoms, hydroxyl, halogen, dihydroxyalkyl, substituted alkyl, aryl, hydroxyaryl, dihydroxyaryl, or $R^4CO_2H$ where $R^4$ is aryl, alkylaryl, hydroxyaryl, and dihydroxyaryl. Examples include ethanoic acid; formic acid; propanoic acid; butanoic acid; hexanoic acid; 2-ethylhexanoic acid; lauric acid; cyclohexylacetic acid; hydroxyacetic acid; mono-, di-, and tri-chloroacetic acid; mono-, di-, and tribromoacetic acid; 3-hydroxypropanoic acid; 2,3-dihydroxypropanoic acid; phenyl acetic acid; diphenylacetic acid; 4-hydroxyphenyl acetic acid; 3,4-dihydroxyphenyacetic acid; 4-methylphenylacetic acid; benzoic acid; 4-hydroxybenzoic acid; 3,4-dihydroxybenzoic acid; 4-methoxy benzoic acid; 4-nitrobenzoic acid; 12-nitrododecanoic acid; and p-toluic acid. The foregoing organic acids are commercially available.

Preferred anhydrides are of the formula $R^1(CO)O(CO)R^2$ wherein $R^1$ and $R^2$ are the same or different and consist of straight chain or branched alkyl radicals having 1 to 18 carbon atoms, cyclic radicals having 1 to 18 carbon atoms, aryl radicals having 1 to 18 carbon atoms, arylalkyl radicals having 1 to 18 carbon atoms, or $R^1$ and $R^2$ form a covalent bond with each other. Examples include acetic anhydride; cis-aconitic anhydride; bromomaleic anhydride; butyric anhydride; chloroacetic anhydride; chlorodifluoroacetic anhydride; crotonic anhydride; decanoic anhydride; dichloroacetic anhydride; glutaric anhydride; heptanoic anhydride; hexanoic anhydride; homophthalic anhydride; iodoacetic anhydride; itaconic anhydride; linoleic anhydride; maleic anhydride; 3-methylglutaric anhydride; methylsuccinic anhydride; oleic anhydride; palmitic anhydride; pentafluoropropionic anhydride; 2-phenylglutaric anhydride; propionic anhydride; stearic anhydride; succinic anhydride; trichloroacetic anhydride; trifluoroacetic anhydride; trimethylacetic anhydride; valeric anhydride; 4-bromo-,1,8-naphthalic anhydride; benzoic anhydride; 4-chloro-1,8-napthalic anhydride; isatoic anhydride; and tetrabromophthalic anhydride.

Other preferred anhydrides include dichloromaleic anhydride; 2,2-dimethylglutaric anhydride; 2,3-dimethylmaleic anhydride; 2,2-dimethylsuccinic anhydride; 2,3-diphenylmaleic anhydride; docosanoic anhydride; 2-dodecen-1-ylsuccinic anhydride; 2-ethylhexanoic anhydride; 3-ethyl-3-methylglutaric anhydride; 3-hydroxyphthalic anhydride; 4-methylphthalic anhydride; 1,4,5,8-naphthalenetetracarboxylic anhydride; 1,8-naphthalic anhydride; 3,4-nitro-1,8-naphthalic anhydride; 3- and 4-nitrophthalic anhydride; phthalic anhydride; tetrabromophthalic anhydride; tetrachlorophthalic anhydride; endo-bicyclo[2.2.2]oct-5-ene-2,3-dicarboxylic anhydride; bicyclo[2.2.2]oct-7-ene-2,3,5,6-tetracarboxylic dianhydride; cis-1,2-cyclohexanedicarboxylic anhydride; 1-cyclopentene-1,2-dicarboxylic anhydride; (±)-hexahydro-4-methylphthalic anhydride; cis-5-norbornene-endo-2,3-dicarboxylic anhydride; cis-1,2,3,6-tetrahydrophthalic anhydride; 3,4,5,6-tetrahydrophthalic anhydride; and diglycolic anhydride. The foregoing anhydrides are commercially available.

Preferred aminoacids are of the formula $R^1R^2NC(R^3R^4)-CO_2H$ where $R^1$, $R^2$, $R^3$, and $R^4$ are the same or different and are selected from hydrogen, alkyl having 1 to 18 carbon atoms, cycloalkyl, substituted alkyl, aryl, substituted aryl, and the corresponding alkali metal and alkaline earth carboxylate salts. Examples include ethylenediaminetetraacetic acid (EDTA); EDTA disodium salt; EDTA dipotassium salt; EDTA trisodium salt; EDTA tripotassium salt; glycine; alanine; valine; leucine; isoleucine; phenylalanine; serine; threonine; methionine; cysteine; cystine; tyrosine; 3,5-diiodo-D-thyronine; tryptophan; proline; hydroxyproline; aspartic acid; and glutamic acid. The foregoing aminoacids are commercially available.

Preferred ammonium salts are of the formula $R^1R^2R^3N^+-H\ R^4R^5R^6C-CO_2^-$ where $R^1$, $R^2$, $R^3$, $R^4$, $R^5$, and $R^6$ are the same or different and selected from the group consisting of hydrogen, alkyl having 1 to 18 carbon atoms, cycloalkyl, substituted alkyl, aryl, and substituted aryl. Examples include ammonium formate; ammonium acetate; ammonium citrate(dibasic); ammonium oxalate; and ammonium L-tartrate(dibasic). Many ammonium salts are commercially available.

Preferred bromoalkanes are of the formulas $(Br)_aC(H)_b$ where a is 1, 2, 3, or 4 and $a+b=4$; $(Br)_c(H)_dC-CH(R')_e\ (R^2)_f$ where c is 1, 2, or 3, $c+d=3$, $e+f=2$, and $R'$ and $R^2$ are the same or different and selected from the group consisting of hydrogen, alkyl having 1 to 18 carbon atoms, substituted alkyl, haloalkyl, aryl, and substituted aryl; and $(Br)_gC(R^3)_h(R^4)_i(R^5)_j$ where g is 1, 2, 3, or 4 and $g+h+i+j=4$ $R^3$, $R^4$, and $R^5$ are the same or different and selected from the group consisting of hydrogen, linear alkyl having 1 to 18 carbon atoms, substituted alkyl, haloalkyl, aryl, and substituted aryl. Examples include bromomethane; dibromomethane; carbon tetrabromide; bromoform; 1,2-dibromobutane; 1,3-dibromobutane; 1,4-dibromobutane; 2,3-dibromobutane; 1,4-dibromo-2,3-butanediol; 2,3-dibromo-1,4-butanediol; 1,4-dibromo-2-butanol; 1,4-dibromo-2-butene; 1,10-dibromodecane; 1,2-dibromoethane; 1,12-dibromododecane; (1,2-dibromoethyl)benzene; 1,7-dibromoheptane; and 1,6-dibromohexane. The foregoing bromoalkanes are commercially available.

Preferred bromoalcohols are of the formula $(Br)_a(H)_b(R^1)_cC-C(H)_d(R^2)_eOH$ where a is 1, 2, or 3; c is 0 or 1; $a+b+c=3$; d is 1 or 2; $d+e=2$; and $R^1$ and $R^2$ are the same or different and selected from the group consisting of hydrogen, alkyl having 1 to 18 carbon atoms, cycloalkyl, substituted alkyl, hydroxyalkyl, and aryl and when $a=3$ and $d=e=1$, $R^2$ may also be OH or $OR^2$ wherein $R^2$ is alkyl having 1 to 18 carbon atoms, cycloalkyl, substituted alkyl, and hydroxyalkyl. Examples include 2,2,2-tribromoethanol; 2,2-dibromoethanol; 2-bromoethanol; 1,4-dibromo-2,3-butanediol; 2,3-dibromo-1,4-butanediol; 1,4-dibromo-2-butanol; 1,3-dibromo-propanol; 2,3-dibromopropanol; 2,2,2-tribromo-1,1-dihydroxyethane; and 2,2,2-tribromo-1-methoxyethanol. Many of the foregoing bromoalcohols are commercially available.

Preferred bromoaromatic esters are of the formula $C_6(Br)_4(CO_2-R^1)(CO_2-R^2)$ where $R^1$ is alkyl having 1 to 18 carbon atoms, substituted alkyl, hydroxyalkyl, aryl, and substituted aryl and $R^2$ is hydrogen and hydroxyalkyl. Examples include mono ethyl ester of tetrabromophthalic acid; mono 2-hydroxyethyl ester of tetrabromophthalic acid; (2-hydroxyprop-1-yl), (2'-hydroxyethoxy)ethyl, mixed diester of tetrabromophthalic acid which is commercially available as PHT4-DIOL ® from Great Lakes Chemical Corporation.

Preferred chloroalcohols are of the formula $(Cl)_a(H)_b(R^1)_cC-C(H)_d(R^2)_eOH$ where a is 1, 2, or 3; c is 0 or 1; $a+b+c=3$; d is 1 or 2; $d+e=2$; and $R^1$ and $R^2$ are the same or different and selected from the group consisting of hydrogen, alkyl having 1 to 18 carbon atoms, cycloalkyl, substituted alkyl, hydroxyalkyl, and aryl and when $a=3$ and $d=e=1$, $R^2$ may also be OH or $OR^2$ wherein $R^2$ is alkyl having 1 to 18 carbon atoms, cycloalkyl, substituted alkyl, and hydroxyalkyl. Examples include 2,2,2-trichloroethanol; 2,2-dichloroethanol; 2-chloroethanol; 1,3-dichloro-2-propanol; 1,4-dichloroethanol; 2,3-butanediol; 1,4-dichloro-2-butanol; 2,2-dichloro-1-pentanol; 1,1-dichloro-2-pentanol; 1-chloropentanol; 2-chloro-1-pentanol; 2-chloro-1-phenylethanol; 1-chloro-1-phenyl-2-propanol; 2,2,2-trichloro-1,1-dihydroxyethane; and 2,2,2-trichloro-1-methoxyethanol. Some chloroalcohols are commercially available.

Preferred nitroalkanes are of the formula $R^1R^2CH_2NO_2$ where $R^1$ is selected from the group consisting of hydrogen, alkyl having 1 to 18 carbon atoms, cycloalkyl, substituted alkyl, aryl, and substituted aryl and $R^2$ is selected from the group consisting of hydrogen and methyl; and $R_3-NO_2$ where $R^3$ is aryl or substituted aryl. Examples include nitromethane; nitroethane; 1-nitropropane; 2-nitropropane; 1-nitrobutane; nitrocyclohexane; 1-nitrohexane; nitrocyclopentane; 1-nitropentane; nitrobenzene; and 1-bromo-4-nitrobenzene. The foregoing nitroalkanes are commercially available.

Preferred nitroalcohols are of the formula $(R)CHOH-CH_2NO_2$ where R is selected from the group consisting of hydrogen, alkyl having 1 to 18 carbon atoms, cycloalkyl, substituted alkyl, aryl, and substituted aryl. Examples include commercially available 2-nitroethanol; 1-nitro-2-propanol; 2-nitro-1-propanol; and 1-phenyl-2-nitroethanol.

Preferred triarylmethyl chlorides are of the formula $R_3CCl$ where R is aryl or substituted aryl. Examples include commercially available triphenylmethyl chloride; tri-(p-methoxyphenyl)methyl chloride; and tri-(p-nonylphenyl)methyl chloride.

Preferred triarylmethyl bromides are of the formula R$_3$CBr where R is aryl or substituted aryl. Examples include commercially available triphenylmethyl bromide; tri-(p-methoxyphenyl)methyl bromide; and tri(p-nonylphenyl)methyl bromide.

Preferred sulfonate esters are of the formula R$^1$SO$_2$OR$^2$ where R$^1$ is selected from the group consisting of aryl and substituted aryl and R$^2$ is selected from the group consisting of alkyl having 1 to 18 carbon atoms and substituted alkyl. Examples include commercially available methyl p-toluenesulphonate; ethyl benzenesulfonate; and methyl p-bromobenzenesulfonate.

Preferred haloalkyl phosphate esters are of the formula $[(X)_a(H)_b(R^1)_cC—CH(R^2)O]_3PO$ where X is chloro or bromo, and a is 1, 2, or 3; c is 0 or 1; a+b+c=3; and R$^1$and R$^2$ are selected from the group consisting of hydrogen, alkyl having 1 to 18 carbon atoms, cycloalkyl, substituted alkyl, aryl, and substituted aryl. Examples include tri(2-chloroethyl) phosphate which is commercially available as FYROL® CEF from Akzo Chemicals, Inc; tri(1-chloro-2-propyl) phosphate which is commercially available as FYROL® PCF from Akzo Chemicals, Inc; tri(2,2-dichloroethyl) phosphate; tri(2,2,2-trichloroethyl) phosphate; tri(2-bromoethyl) phosphate; tri(2,2-dibromoethyl) phosphate; and tri(2,2,2-tribromoethyl) phosphate.

Carbon molecular sieves such as those disclosed in commonly assigned U.S. Pat. Nos. 4,906,796; 4,940,824; and 4,940,825 may be used in practicing the present invention. Activated carbon such as that disclosed by commonly assigned U.S. Pat. No. 4,950,816 may be used in practicing the present invention. Zeolite molecular sieves such as those disclosed in commonly assigned the present invention.

The more preferred additives include esters, organic acids, anhydrides, aminoacids, ammonium salts, bromoalkanes, bromoalcohols, chloroalcohols, nitroalkanes, nitroalcohols, triarylmethyl chlorides, triarylmethyl bromides, 3-sulfolene, zinc dialkyldithiophosphate (ZDTP), haloalkyl phosphate esters, carbon molecular sieves, powdered activated carbon, zeolite molecular sieves, sulfonate esters, and haloalkyl phosphate esters.

The most preferred additives include bromoalkanes, bromoalcohols, chloroalcohols, and nitroalkanes.

Preferably, the additive is present at an amount of up to about 10 parts by weight per hundred parts of polyol. More preferably, the additive is present at an amount of about 0.2 part to about 10 parts by weight per hundred parts of polyol. The additive is introduced preferably by dissolution in the blowing agent, in the polyol, in a mixture of two or more of the components, in the entire formulation mixture prior to reaction with the polyisocyanate, or it can be added as a separate stream at the point of mixing in the polymerization process. As such, the present invention also provides a composition of hydrohalocarbon blowing agent and at least one additive wherein the at least one additive is capable of decreasing the amount of decomposition of the hydrohalocarbon blowing agent to haloalkenes. The present invention also provides a premix of polyol, hydrohalocarbon blowing agent, and at least one additive wherein the at least one additive is capable of decreasing the amount of decomposition of the hydrohalocarbon blowing agent to haloalkenes. The present invention also provides a composition of polyol, hydrohalocarbon blowing agent, catalyst, surfactant, and at least one additive wherein the at least one additive is capable of decreasing the amount of decomposition of the hydrohalocarbon blowing agent to haloalkenes. The additive is introduced preferably by dissolution in the blowing agent or in the entire formulation mixture prior to reaction with the polyisocyanate.

The beneficial effect of these selected chemical additives in polyurethane and polyurethane modified polyisocyanurate foam formulations is realized during the polymerization reaction within the normal processing time and temperature conditions occurring during typical foam blowing.

Examples of polyols used in polyurethane foams include aromatic amino-based polyether polyols such as those based on mixtures of 2,4-and 2,6-toluenediamine condensed with ethylene oxide and/or propylene oxide. These polyols are used in pour-in-place molded foams. Another example is aromatic alkylamino-based polyether polyols such as those based on ethoxylated and/or propoxylated aminomethylated nonylphenol derivatives. These polyols are used in rigid polyurethane spray foams. Another example is sucrose-based polyether polyols such as those based on sucrose derivatives condensed with ethylene oxide and/or propylene oxide. These polyols are used in rigid high and low density foams, for slabstock, froth foams, and molded foams.

Examples of polyols used in polyurethane modified polyisocyanurate foams include aromatic polyester polyols such as those based on complex mixtures of phthalate-type or terephthalate-type esters formed from polyols such as ethylene glycol, diethylene glycol, or propylene glycol. These polyols are used in rigid laminated boardstock, can be blended with other types of polyols such as sucrose based polyols, and used in other applications such as molded polyurethane foams.

Examples of polyisocyanates include aromatic diisocyanates such as those based on mixtures of 2,4- and 2,6-toluene diisocyanate. These polyisocyanates are used in specialty foams. Another example is methylene diphenyl diisocyanate (MDI) which typically contains 55% diphenylmethane diisocyanates, 25% triisocyanates, and 20% higher polyisocyanates.

Any hydrofluorocarbon blowing agent may be used in the present invention. Preferred hydrofluorocarbon blowing agents include 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1,1,1,3-tetrafluoropropane; 1,1,2,3,3-pentafluoropropane; and 1,1,1,3,3-pentafluoro-n-butane.

Any hydrochlorofluorocarbon blowing agent may be used in the present invention. Preferred hydrochlorofluorocarbon blowing agents include 1-chloro-1,2-difluoroethane; 1-chloro-2,2-difluoroethane; 1-chloro-1,1-difluoroethane; 1,1-dichloro-1-fluoroethane; 1-chloro-1,1,2-trifluoroethane; 1-chloro-1,2,2-trifluoroethane; 1,1-dichoro-1,2-difluoroethane; 1-chloro-1,1,2,2-tetrafluoroethane; 1-chloro-1,2,2,2-tetrafluoroethane; 1,1-dichloro-1,2,2-trifluoroethane; 1,1-dichloro-2,2,2-trifluoroethane; and 1,2-dichloro- 1,1,2-trifluoroethane. The most preferred hydrochlorofluorocarbon blowing agent is 1,1-dichloro-1-fluoroethane.

Mixtures of the preferred hydrohalocarbon blowing agents may also be used in the present invention. Preferred mixtures of hydrohalocarbon blowing agents include a mixture of 1,1-dichloro-1-fluoroethane with 1,1-dichloro-2,2,2-trifluoroethane and a mixture of 1,1- dichloro-2,2,2-trifluoroethane with 1,2-dichloro-1,2,2-trifluoroethane.

Examples of surfactants for polyurethane or polyurethane modified polyisocyanurate foams are polyether modified polysiloxanes. These silicone surfactants are typically non-hydrolyzable siliconepolyoxyethylene/polyoxypropylene copolymers. Other examples include non-silicon-containing organic surfactants which are proprietary in structure. Tegostab ®B-8404 is a silicone surfactant which is available from Goldschmidt Chemical Company. Other commercially available silicone surfactants include Tegostab ®B-8404 which is available from Goldschmidt Chemical Company, Dabco ®DC-193 which is available from Air Products and Chemicals, Inc., and L-5402 ® which is available from Union Carbide. LK ®-443 is an organic surfactant which is available from Air Products and Chemicals, Ltd.

It will be evident to those skilled in the art that water may be included in the polyurethane or polyurethane modified polyisocyanurate foam formulations to generate carbon dioxide as a supplemental blowing agent by reaction with polyisocyanate. In addition, water generated intermediates can form cross-linked polymeric structures that may enhance physical properties of the final product.

Examples of catalysts used for polyurethane foams include tertiary amines such as triethylene diamine; N,N-dimethylethanolamine; 1,8-diaza-bicyclo(5.4,0) undecene-7; N,N-dimethylcyclohexylamine; and 2,4,6-tris(dimethylaminomethyl)phenol.

Examples of catalysts for polyurethane modified polyisocyanurate foams include potassium 2-ethylhexanoate; hexahydro-1,3,5-tris[3(N,N-dimethylamino)-propyl]-1,3,5-triazine; and N-2-hydroxypropyltrimethylammonium 2-ethylhexanoate. These are typically used in conjunction with tertiary amine polyurethane catalysts.

Standard techniques known in the art for preparing foam may be used in the present invention. Standard additives such as surfactants, water, and fire retardants may also be used. Typically used ratios of polyisocyanate to polyol and of blowing agent to these components may be used in practicing the present invention.

The present invention also provides a process for preparing polyurethane or polyurethane modified polyisocyanurate foams. The process comprises the step of reacting polyol with polyisocyanate in the present of hydrohalocarbon blowing agent, catalyst, surfactant, and at least one additive. The at least one additive is capable of decreasing the amount of decomposition of the hydrohalocarbon blowing agent during polymerization of the polyisocyanate and the polyol. The present invention also provides a polyurethane or polyurethane modified polyisocyanurate foam formed by the foregoing process. The present invention also provides a polyurethane or polyurethane modified polyisocyanurate article formed by the foregoing process.

In another embodiment, the present invention also provides polyurethane compositions and polyurethane modified polyisocyanurate compositions comprising polyisocyanate, polyol, hydrohalocarbon blowing agent, catalyst, surfactant, and at least two additives wherein each additive is capable of decreasing the amount of decomposition of hydrohalocarbon to haloalkenes during polymerization of the isocyanate and the polyol. Preferably, the second additive is selected from the group consisting of nitroalkanes; bromoalkanes; bromoalcohols; chloroalcohols; and di(hydroxyalkyl) esters of tetrabromophthalic acid.

Preferred nitroalkanes are of the formula $R^1R^2CH-NO_2$ where $R^1$ is selected from the group consisting of hydrogen, alkyl having 1 to 18 carbon atoms, cycloalkyl, substituted alkyl, aryl, and substituted aryl and $R^2$ is selected from the group consisting of hydrogen and methyl. More preferred nitroalkanes include nitromethane; nitroethane; 1-nitropropane; 2-nitropropane; 1-nitrobutane; nitrocyclohexane; 1-nitrohexane; nitrocyclopentane; and 1-nitropentane. The foregoing nitroalkanes are commercially available.

Preferred bromoalkanes are of the formula $(Br)_aC(R^1)_b(R^2)_c(R^3)_d$ where a is 1, 2, 3, or 4 and $a+b+c+c=4$ and $R^1$, $R^2$, and $R^3$ are the same or different and selected from the group consisting of hydrogen, linear alkyl having 1 to 18 carbon atoms, substituted alkyl, haloalkyl, aryl, and substituted alkyl. More preferred bromoalkanes include bromomethane; dibromomethane; carbon tetrabromide; bromoform; 1,2-dibromobutane; 1,3-dibromobutane; 1,4-dibromobutane; 2,3-dibromobutane; 1,4-dibromo-2,3-butanediol; 2,3-dibromo-1,4-butanediol; 1,4-dibromo-2-butanol; 1,4-dibromo-2-butene 1,10-dibromodecane; 1,2-dibromoethane; 1,12-dibromododecane; (1,2-dibromoethyl)benzene; 1,7-dibromoheptane; and 1,6-dibromohexane. The foregoing bromoalkanes are commercially available.

Preferred bromoalcohols are of the formula $(Br)_a(H)_b(R^1)_cC-C(H)_d(R^2)_eOH$ where a is 1, 2, or 3; c is 0 or 1; $a+b+c=3$; d is 1 or 2; $d+e=2$; and $R^1$ and $R^2$ are the same or different and selected from the group consisting of hydrogen, alkyl having 1 to 18 carbon atoms, cycloalkyl, substituted alkyl, hydroxyalkyl, aryl, and substituted aryl and when $a=3$ and $d=e=1$, $R^2$ may also be OH or $OR^2$ wherein $R^2$ is alkyl having 1 to 18 carbon atoms, cycloalkyl, substituted alkyl, and hydroxyalkyl, More preferred bromoalcohols include 2,2,2-tribromoethanol; 2,2-dibromoethanol; 2-bromoethanol; 1,4-dibromo-2,3-butanediol; 2,3-dibromo-1,4-butanediol; 1,4-dibromo-2-butanol; 1,3-dibromopropanol; 2,3-dibromopropanol; 2,2,2-tribromo-1,1-dihydroxyethane; and 2,2,2-tribromo-1-methoxyethanol. Many of the foregoing bromoalcohols are commercially available.

Preferred chloroalcohols are of the formula $(Cl)_a(H)_b(R^1)_cC-C(H)_d(R^2)_eOH$ where a is 1, 2, or 3; c is 0 or 1; $a+b+c=3$; d is 1 or 2; $d+e=2$; and $R^1$ and $R^2$ are the same or different and selected from the group consisting of hydrogen, alkyl having 1 to 18 carbon atoms, cycloalkyl, substituted alkyl, hydroxyalkyl, and aryl and when $a=3$ and $d=e=1$, $R^2$ may also be OH or $OR^2$ wherein $R^2$ is alkyl having 1 to 18 carbon atoms, cycloalkyl, substituted alkyl, and hydroxyalkyl. More preferred chloroalcohols include 2,2,2-trichloroethanol; 2,2-dichloroethanol; 2-chloroethanol; 1,3-dichloro-2-propanol; 1,4-dichloroethanol; 2,3 -butanediol; 1,4-dichloro-2-butanol; 2,2-dichloro-1-pentanol; 1,1-dichloro-2-pentanol; 1-chloropentanol; 2-chloro-1-pentanol; 2-chloro-1-phenylethanol; 1-chloro-1-phenyl-2-propanol; 2,2,2-trichloro-1,1-dihydroxyethane; and 2,2,2-trichloro-1-methoxyethanol. Some chloroalcohols are commercially available.

The preferred di(hydroxyalkyl)ester of tetrabromophthalic acid is PHT4-DIOL ® which is the (2'-hydroxyethoxy)ethyl, 2-hydroxypropyl mixed diester of tetrabromophthalic acid and is available from Great Lakes Chemical Corporation.

The most preferred mixtures include at least nitromethane and carbon tetrabromide, at least nitromethane and the PHT4-DIOL® additive described above, at least nitromethane and 2,2,2-trichloroethanol, at least carbon tetrabromide and PHT4-DIOL® additive, at least nitromethane and 2,2,2-tribromoethanol, and at least 2,2,2-trichloroethanol and PHT4-DIOL® additive.

The weight ratio of one additive to the other may be varied from about 1:99 to about 99:1.

Preferably, each additive is present at an amount of at least about 0.2 part by weight per hundred parts of polyol. More preferably, each additive is present at an amount of about 0.5 part to about 6 parts by weight per hundred parts of polyol. Each additive is introduced preferably by dissolution in the blowing agent, in the polyol, in a mixture of two or more of the components, or it can be added as a separate stream at the point of mixing in polymerization process. The additive is introduced preferably by dissolution in the blowing agent or in the entire foam formulation mixture prior to reaction with the polyisocyanate. The additives can be added to the hydrohalocarbon to form a composition comprising hydrohalocarbon and at least two additives wherein said each additive is capable of decreasing the amount of decomposition of hydrohalocarbon to haloalkenes. The foregoing composition can be added to polyol to form a composition comprising hydrohalocarbon, polyol, and at least two additives wherein said each additive is capable of decreasing the amount of decomposition of hydrohalocarbon to haloalkenes.

The practice of this invention is illustrated by the following non-limiting examples.

The polyols used in the Examples and Comparatives are in Table I below. The amine polyols are aromatic diaminopolyether polyols and the polyester polyols are aromatic polyester polyols.

TABLE I

|   | | Source |
|---|---|---|
| AMINE POLYOL A | Pluracol ® 824 | BASF CORP. |
| B | Voranol ® 390 | DOW CHEMICAL |
| C | Multranol ® 4063 | MOBAY CORP. |
| POLYESTER POLYOL A | Chardol ® 336A | OXID INC. |
| B | Stepanpol ® PS-2502A | STEPAN CO. |
| C | Tetrate ® 254 | CAPE INDUSTRIES |
| D | Terate ® 203 | CAPE INDUSTRIES |

EXAMPLE 1

A typical commercial polyurethane foam for appliance applications was prepared from a commercial methylene diphenyl diisocyanate(MDI) and a formulation comprised of an aromatic diaminopolyether polyol designated as Amine Polyol A, plus other typical components including surfactant, tertiary amine catalyst, and HCFC-141b as the blowing agent. The quantities used in grams per hundred grams of polyol are shown in Table II below and are representative of a standard polyurethane formulation. Note that the term "index" in Tables II and VII is the ratio of the actual amount of polyisocyanate used in a formulation to the theoretical amount required, expressed as a percentage. The quantity of polyisocyanate was varied slightly in order to meet the stoichiometric requirements of the various polyols.

In Table II, the silicone surfactant was B8404® obtained from Goldschmidt Chemical Co. The amine catalyst was POLYCAT 8® which is N,N-dimethyl-cyclohexylamine obtained from Air Products and Chemicals, Inc. The polyisocyanate was Lupranate M-20S® obtained from BASF.

TABLE II

| Standard Polyurethane Foam Formulation | |
|---|---|
| COMPONENT | WT-GRAMS |
| Amine Polyol A, B, or C | 100 |
| Silicone Surfactant | 2 |
| Amine Catalyst | 1.5 |
| Polyisocyanate (INDEX) | 102 (110) |
| HCFC-14b | 35 |

The "hand mix" procedure for preparing foams, to be described, follows commonly accepted practices used for experimental evaluations in the rigid polyurethane/polyisocyanurate foam industry. The polyol, 200 grams, was weighted into a quart container followed by the appropriate quantities of catalyst(s), surfactant, and HCFC-141b blowing agent. This mixture of all formulation components, excluding the reactive polyisocyanate, is known to the industry as the B-side of the foam formulation. This B-side blend was thoroughly mixed at slow speed for one minute using a Jiffy speed mixer. HCFC-141b that was lost during the mixing was replaced. The required amount of polyisocyanate was then added with thorough mixing at ca. 2200 revolutions per minute for 10 seconds. The reaction mixture was rapidly poured into a 25.4 cm × 25.4 cm × 10.2 cm cardboard cakebox. The reactivity profile, i.e. cream, gel, and tackfree times, was recorded and the foam was cured overnight at room temperature. The cured rigid foam was sampled by a specific cutting technique that removes four foam strips, measuring 1 cm × 1 cm × 9 cm, from the center of the foam bun. The four strips were placed in an 8 oz screw cap bottle which is then sealed with a #10130 MININERT® push button gas chromatographic sampling valve available from Pierce Chemical Co.

The absolute amounts of haloalkenes formed in foams blown with HCFC-141b may be determined using capillary gas chromatography as outlined in Table III below.

TABLE III

| CHROMATOGRAPH: | HEWLETT-PACKARD 5890 |
|---|---|
| CARRIER GAS: | HELIUM |
| INJECTOR: | CAPILLARY: CAPABLE OF 50:1 SPLIT |
| DETECTOR: | FID |
| COLUMN: | DB-1301 FUSED SILICA, 120 m × 0.25 mm, 1 μm FILM. AVAILABLE FROM J & W |

Three accurately prepared standards of the compounds of interest covering the ranges expected in the samples were prepared in the same type bottle used for the samples. Standards were prepared and analyzed daily.

The operating parameters are in Table IV below.

TABLE IV

| | |
|---|---|
| CARRIER FLOW RATE: | HEAD PRESSURE 40 PSIG, He |
| INJECTOR TEMPERATURE: | 150° C. |
| DETECTOR TEMPERATURE: | 250° C. |
| COLUMN CONDITIONS: | 20° C. FOR 15 MIN. 5° C./MIN. TO 40° C. |
| HOLD: | 5 MINUTES, 15° C./MIN. TO 230° C. |
| HOLD: | 30 MINUTES |
| INJECTION SIZE: | 2.0-ML VIA GAS TIGHT SYRINGE. |

Samples were received in 250-ml glass screw top bottles sealed with the previously described Mininert ® Valves.

This method was used to separate and quantify the compounds in Table V below. In Table V, RT is retention time.

TABLE V

| COMPOUND | STRUCTURE | RT (mins) |
|---|---|---|
| 1131a | $CH_2=CClF$ | 12.71 |
| 141b | $CCl_2F-CH_3$ | 23.82 |

All standards and samples were injected as vapor (gas) via a gas tight syringe. Calibration graphs of weight vs. peak were constructed. The peak area from the sample was determined and converted to weight via the calibration graph.

The weight of each component was taken from the calibration graphs. The equation is as follows:

$$\frac{\mu g \text{ component}}{g\text{-HCFC-141b}} = \frac{\mu g\text{-component from curve}}{g\text{-HCFC-141b from curve}}$$

The HCFC-1131a analysis for this portion of Example 1, without an additive present, is shown in Table VI. An identical formulation was prepared except that nitromethane, 0.5 gram/100 grams polyol, was added to the B-side as a solution in the HCFC-141b blowing agent. The analysis for the resulting foam, shown in Table VI below, indicates a substantially lower concentration of HCFC-1131a than in the control experiment without nitromethane present. In Table VI, PU stands for polyurethane, PI stands for polyurethane modified polyisocyanurate, and the polyols are as in Table I above.

polyester polyol, designated Polyester Polyol A, was used in a polyurethane modified polyisocyanurate formulation and nitromethane, 0.5 gram/100 grams polyol, was added. The formulation composition designated as a standard polyurethane modified polyisocyanurate formulation, is shown in Table VII below. The potassium octoate was Dabco ®K-15 obtained from Air Products and Chemicals, Inc. The amine catalyst was Dabco ®TMR-30 which is 2,4,6-tris(dimethylaminomethyl)phenol obtained from Air Products and Chemicals, Inc. The analysis for HCFC-1131a, with and without nitromethane, is shown in Table VI above.

TABLE VII

Standard Polyurethane Modified Polyisocyanurate Foam Formulation

| COMPONENT | WT-GRAMS |
|---|---|
| Polyester Polyol A, B, C, or D | 100 |
| Silicone Surfactant | 2 |
| Potassium Octoate | 3 |
| Amine Catalyst | 0.5 |
| Polyisocyanate (INDEX) | 164 (275) |
| HCFC-141b | 35 |

EXAMPLE 4

The foam of Example 3 was prepared except the aromatic polyester polyol was Polyester Polyol B and nitroethane was added to the formulation at a concentration of 0.62 gram/100 grams polyol. The presence of nitroethane resulted in a lower concentration of HCFC-1131a as reported in Table VI above.

EXAMPLE 5

The foam of Example 3 was prepared except the

TABLE VI

| | | | | $\mu g$ 1131a/g 141b | |
|---|---|---|---|---|---|
| Example | Foam Type | Polyol | Nitroalkane (g/100 g Polyol) | Without Additive | With Additive |
| 1 | PU | Amine Polyol A | $CH_3NO_2$ (0.5) | 2816 | 521 |
| 2 | PU | Amine Polyol B | $CH_3NO_2$ (0.5) | 930 | 285 |
| 3 | PI | Polyester Polyol A | $CH_3NO_2$ (0.5) | 1999 | 204 |
| 4 | PI | Polyester Polyol B | $C_2H_5NO_2$ (0.62) | 2728 | 646 |
| 5 | PI | Polyester Polyol C | $HOC_2H_4NO_2$ (0.75) | 1920 | 1106 |
| 6 | PI | Polyester Polyol C | $CH_3NO_2$ (0.5) | 1920 | 100 |

EXAMPLE 2

This polyurethane foam was prepared as described in Example 1 except that Amine Polyol B was used; see Tables I and II. For this and all other Examples and Comparatives, the laboratory procedures and analyses are as described in Example 1. In the same formulation, the presence of nitromethane resulted in a lower concentration of HCFC-1131a as reported in Table VI above.

EXAMPLE 3

A foam was prepared following the procedure of Example 1 except that a typical commercial aromatic aromatic polyester polyol was Polyester Polyol C and nitroethanol was added at a concentration of 0.75 gram/100 grams polyol. The presence of 2-nitroethanol resulted in a lower concentration of HCFC-1131a as reported in Table VI above.

EXAMPLE 6

The foam of Example 5 was prepared and nitromethane was added at a concentration of 0.5 gram/100 grams of polyol. The presence of nitromethane resulted in a substantially lower concentration of HCFC-1131a as reported in Table VI above.

The data in Table VI demonstrate the effectiveness of the presence of nitroalkanes in lowering the concentration of HCFC-1131a formed in polyurethane and polyurethane modified polyisocyanurate foams blown with HCFC-141b.

EXAMPLES 7 THROUGH 25

Examples 7 through 25, following the same experimental and analytical procedure for Examples 1 through 6, are now listed in Table VIII below to illustrate the additives to polyurethane and polyurethane modified polyisocyanurate foams that result in a lower concentration of the dehydrochlorination byproduct, HCFC-1131a, generated from the blowing agent, HCFC-141b. In Table VIII, PU stands for polyurethane, PI stands for polyurethane modified polyisocyanurate, and the Amine Polyol and Polyester Polyol are as in Table I above.

The additives used were as follows. In Example 7, acetic acid was used. In Example 8, ammonium acetate was used. In Example 9, acetic anhydride was used. In Example 10, ethylenediaminetetraacetic acid disodium salt was used which is soluble in water; the blowing agent was a mixture of 25 parts of HCFC-141b per hundred parts polyol and 1 part of water per hundred parts polyol. In Example 11, bromoform was used. In Example 12, 2,2,2-tribromoethanol was used. In Example 13, diethoxylated propoxylated diester of tetrabromophthalic acid which is available from Great Lakes Chemical Corporation under PHT4-DIOL ® was used. In Example 14, nitromethane was used. In Example 15, 2-nitroethanol was used. In Example 16, 2,2,2-tribromoethanol was used. In Example 17, triphenylmethyl chloride was used. In Example 18, 3-sulfolene was used. In Example 19, zinc di(2-ethylhexyl)-dithio phosphate was used. In Example 20, 50 percent by weight suspension of a zeolite A type 4Å molecular sieve in castor oil which is available from Mobay Corporation under Baylith T Paste ® was used by suspending in the polyol. In Example 21, powdered activated carbon which is available from Calgon Corporation under BL Pulverized ®.was used. In Example 22, carbon tetrabromide was used. In Example 23, 2,2,2-trichloroethanol was used. In Example 24, tri(1-chloro-2-propyl)phosphate was used. In Example 25, 1-bromo-4-nitrobenzene was used.

TABLE VIII

| Expl | Foam Type | Amine Polyol | Polyester Polyol | Additive | g/100 g Polyol | Dissolved in | μg 1131a/g 141b Without Additive | μg 1131a/g 141b With Additive |
|---|---|---|---|---|---|---|---|---|
| 7 | PI | — | B | $CH_3CO_2H$ | 0.51 | Catalyst | 2728 | 1676 |
| 8 | PU | A | — | $NH_4OAc$ | 0.52 | Polyol | 2816 | 1329 |
| 9 | PI | — | B | $(CH_3CO)_2O$ | 0.3 | Polyol | 2728 | 2024 |
| 10 | PI | — | B | EDTA.2Na | 0.18 | $H_2O$ | 3117 | 1005 |
| 11 | PI | — | B | $CHBr_3$ | 2.5 | 141b | 2728 | 118 |
| 12 | PI | — | C | $HOCH_2CBr_3$ | 2.1 | 141b | 1920 | 119 |
| 13 | PI | — | B | PHT4-DIOL ® | 5 | Polyol | 2728 | 623 |
| 14 | PI | — | A | $CH_3NO_2$ | 0.5 | 141b | 1999 | 204 |
| 15 | PI | — | C | $HOCH_2CH_2NO_2$ | 0.75 | Polyol | 1920 | 1106 |
| 16 | PU | A | — | $HOCH_2CBr_3$ | 2.1 | 141b | 2816 | 152 |
| 17 | PI | — | B | $(C_6H_5)_3CCl$ | 2.5 | 141b | 2728 | 78 |
| 18 | PI | — | B | 3-sulfolene | 2.5 | Polyol | 2708 | 775 |
| 19 | PI | — | B | ZDTP | 2.5 | 141b | 2728 | 1077 |
| 20 | PI | — | B | 4Å MOL SIEVE | 10 | Polyol | 2728 | 732 |
| 21 | PI | — | B | POWD ACT CARBON | 10 | Isocyanate | 2728 | 1730 |
| 22 | PU | C | — | $CBr_4$ | 2.5 | 141b | 170 | 41 |
| 23 | PI | — | D | $HOCH_2CCl_3$ | 1.1 | 141b | 1973 | 139 |
| 24 | PI | — | D | tri(1-chloro-2-propyl)phosphate | 10 | B-side | 1973 | 961 |
| 25 | PI | — | B | 2-bromo-4-nitrobenzene | 1.2 | 141b | 2782 | 2005 |

EXAMPLES 26 THROUGH 50

Examples 1 through 25 are repeated except that the blowing agent is 1,1-dichloro-2,2,2-trifluoroethane instead of 1,1-dichloro-1-fluoroethane.

EXAMPLES 51 THROUGH 75

Examples 1 through 25 are repeated except that the blowing agent is ,1,2-dichloro-1,1,2-trifluoroethane instead of 1,1-dichloro-1-fluoroethane.

EXAMPLES 76 THROUGH 80

Samples consisting of approximately 2 grams of 141b with Pluracol ®824 (1.01–1.07 grams), which also contained acetic anhydride (Aldrich Chemical Co. Inc., ACS Reagent Grade) in the amounts indicated in Table X below were prepared in 9 Milliliter volume Pierce "Hypo" vials equipped with Pierce Mininert valves. Two controls consisting of HCFC-141b and acetic anhydride were also prepared. These samples were heated at 134° F. for 137 hours. The head space and liquid phase of all the samples were analyzed by GC (6' 0.1% SP1000 on Carbowax C) for HCFC-1131a and HCFC-151a. Known samples of HCFC-1131a and HCFC-151a were used as standards. The peaks were identified by retention times. As shown in Table IX, all samples containing acetic anhydride contain less HCFC-1131a than the control HCFC-141b heated for the same time.

TABLE IX

| Ex | Pluracol 824 ® (g) | Acetic Anhydride (μL) | 1131a (area % head space) |
|---|---|---|---|
| 76 | 1.0263 | 0 | 0.0177 |
| 77 | 1.0055 | 1 | 0.0019 |
| 78 | 1.0665 | 10 | 0.0013 |
| 79 | 1.0216 | 50 | 0.0003 |
| 80 | 1.0527 | 50 | 0.0010 |

EXAMPLE 81

The same polyurethane foam as in Example 1 was prepared except that as the second additive, the PHT4-DIOL® additive (5.3 grams/100 grams polyol) described above was used. The catalyst was POLYCAT 8® which is N,N-dimethylcyclohexylamine and is commercially available from Air Products and Chemicals, Inc. The analysis for HCFC-1131a is shown in Table X below.

TABLE X

| EX | AMINE POLYOL | CAT | ADD. #1 (g/100 g polyol) | ADD. #2 (g/100 g polyol) | μg 1131a/g 141b |
|----|--------------|-----|--------------------------|--------------------------|-----------------|
| 81 | A | POLYCAT 8® | CH$_3$NO$_2$ (0.5) | PHT4-DIOL (5.3) | 394 |

EXAMPLE 82

The same polyurethane modified polyisocyanurate foam as in Example 4 was prepared except that an additive mixture of nitromethane, 0.25 gram/100 grams polyol, and 2,2,2-trichloroethanol, 1.1 grams/100 grams polyol, was used. The analysis for HCFC-1131a is shown in Table XI below.

TABLE XI

| EX | POLYESTER POLYOL | CAT | ADD. #1 (g/100 g polyol) | ADD. #2 (g/100 g polyol) | μg 1131a g 141b |
|----|------------------|-----|--------------------------|--------------------------|-----------------|
| 82 | B | K-15®/ TMR-30® amine | CH$_3$NO$_2$ (0.25) | HOCCCl$_3$ (1.1) | 163 |

COMPARATIVES A THROUGH G

Examples of chemical additives that were ineffective in substantially reducing the formation of haloalkenes in several standard polyurethane and polyurethane modified polyisocyanurate foam formulations are listed in Table XII below. In Table XII, PU stands for polyurethane, PI stands for polyurethane modified polyisocyanurate, and the polyols are from Table I above.

We tried a phosphite as shown in Comparative A above and found that it was ineffective in substantially reducing the formation of HCFC-1131a. We also tried nitroethanol as shown in Comparative B above and found that it increased the formation of HCFC-1131a. We also tried a phosphate as shown in Comparative C and found that it was ineffective in substantially reducing the formation of HCFC-1131a. We also tried a phenol as shown in Comparatives D and F and found that it increased the formation of HCFC-1131a. We also tried an ether as shown in Comparatives E and G and found that it increased the formation of HCFC-1131a.

TABLE XII

| CO | FOAM TYPE | POLYOL | ADDITIVE | μ1131a/g 141b in Absence/in Presence of Additive | |
|----|-----------|--------|----------|---|---|
| A | PI | Polyester Polyol B | Tri-isodecyl Phosphite | 2728 | 2234 |
| B | PU | Amine Polyol A | HOCH$_2$CH$_2$NO$_2$ | 2816 | 3843 |
| C | PI | Polyester Polyol B | Tri(1-chloro-2-propyl)phosphate | 2728 | 2305 |
| D | PI | Polyester Polyol B | 2,6-ditert-butyl-4-methyl phenol | 2728 | 4411 |
| E | PI | Polyester Polyol B | glycidyl-1-naphthyl ether | 2728 | 4014 |
| F | PU | Amine Polyol A | 2,6-di tert butyl-4-methyl phenol | 2816 | 3648 |
| G | PU | Amine Polyol A | glycidyl-1-naphthyl ether | 2816 | 3544 |

Having described the invention in detail and by reference to preferred embodiments thereof, it will be apparent that modifications and variations are possible without departing from the scope of the invention defined in the appended claims.

What is claimed is:

1. A premix comprising polyol, hydrohalocarbon blowing agent, and at least one additive wherein said at least one additive is capable of decreasing the amount of decomposition of said hydrohalocarbon blowing agent to haloalkenes.

2. A composition comprising polyol, hydrohalocarbon blowing agent, catalyst, surfactant, and at least one additive wherein said at least one additive is capable of decreasing the amount of decomposition of said hydrohalocarbon blowing agent to haloalkenes.

3. A composition comprising polyisocyanate, polyol, hydrohalocarbon blowing agent, catalyst for polymerization of said polyisocyanate and said polyol, surfactant, and at least one additive wherein said at least one additive is capable of decreasing the amount of decomposition of said hydrohalocarbon blowing agent to haloalkenes during polymerization of said polyisocyanate and said polyol.

4. The composition of claim 3 wherein said hydrohalocarbon blowing agent is selected from the group consisting of hydrofluorocarbon and hydrochlorofluorocarbon.

5. The composition of claim 4 wherein said hydrohalocarbon blowing agent is hydrofluorocarbon.

6. The composition of claim 5 wherein said hydrofluorocarbon blowing agent is selected from the group consisting of 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1,1,1,3-tetrafluoropropane; 1,1,2,3,3-pentafluoropropane; and 1,1,1,3,3-pentafluoro-n-butane.

7. The composition of claim 4 wherein said hydrohalocarbon blowing agent is hydrochlorofluorocarbon.

8. The composition of claim 7 wherein said hydrochlorofluorocarbon blowing agent is 1-chloro-1,2-difluoroethane; 1-chloro-2,2-difluoroethane; 1-chloro-1,1-difluoroethane; 1,1-dichloro-1-fluoroethane; 1-chloro-1,1,2-trifluoroethane; 1-chloro-2,2-trifluoroethane; 1,1-dichloro-1,2-difluoroethane; 1-chloro-1,1,2,2-tetrafluoroethane; 1-chloro-1,2,2,2-tetrafluoroethane; 1,1-dichloro-1,2,2-trifluoroethane; 1,1-dichloro-2,2,2-trifluoroethane; 1,2-dichloro-1,1,2-trifluoroethane; mixtures of 1,1-dichloro-1-fluoroethane and 1,1-dichloro-2,2,2-trifluoroethane; and mixtures of 1,1-dichloro-2,2,2-trifluoroethane and 1,2-dichloro-1,2,2-trifluoroethane.

9. The composition of claim 3 wherein said haloalkenes include 1-chloro-1-fluoroethylene; 1,1-dichloroethylene; and 1,1-dichloro-2,2-difluoroethylene.

10. The composition of claim 3 wherein said at least one additive is additive selected from the group consisting of esters, organic acids, anhydrides, aminoacids, ammonium salts, bromoalkanes, bromoalcohols, bromoaromatic esters, chloroalcohols, nitroalkanes, nitroalcohols, triarylmethyl chlorides, triarylmethyl bromides, 3-sulfolene, zinc dialkyldithiophosphate, sulfonate esters, haloalkyl phosphate esters, carbon molecular sieves, activated carbon, and zeolite molecular sieves.

11. The composition of claim 10 wherein said at least one additive is present in an amount up to about 10 parts by weight per hundred parts of said polyol.

12. The composition of claim 3 wherein said at least one additive is additive selected from the group consisting of esters, organic acids, anhydrides, aminoacids, ammonium salts, bromoalkanes, bromoalcohols, chloroalcohols, nitroalkanes, nitroalcohols, triarylmethyl chlorides, triarylmethyl bromides, 3-sulfolene, zinc dialkyldithiophosphate, haloalkyl phosphate esters, carbon molecular sieves, activated carbon, zeolite molecular sieves, sulfonate esters, and chloroalkyl phosphates.

13. The composition of claim 3 wherein said at least one additive is selected from the group consisting of bromoalkanes, bromoalcohols, chloroalcohols, and nitroalkanes.

14. The composition of claim 10 wherein at least two additives are present.

15. The composition of claim 14 wherein said second additive is selected from the group consisting of nitroalkanes, bromoalkanes, bromoalcohols, chloroalcohols, and di(hydroxyalkyl)esters of tetrabromophthalic acid.

16. A process for preparing polyurethane or polyurethane modified polyisocyanurate foams comprising the step of:
reacting polyol with polyisocyanate in the presence of hydrohalocarbon blowing agent, catalyst, surfactant, and at least one additive wherein said at least one additive is capable of decreasing the amount of decomposition of said hydrohalocarbon blowing agent to haloalkenes during polymerization of said polyisocyanate and said polyol.

17. Polyurethane or polyurethane modified polyisocyanurate foams prepared by the process of claim 16.

18. Polyurethane or polyurethane modified polyisocyanurate foam articles prepared by the process of claim 16.

19. The process of claim 16 wherein said hydrohalocarbon blowing agent is selected from the group consisting of hydrofluorocarbon and hydrochlorofluorocarbon.

20. The process of claim 19 wherein said hydrohalocarbon blowing agent is hydrofluorocarbon.

21. The process of claim 20 wherein said hydrofluorocarbon blowing agent is selected from the group consisting of 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1,1,3-tetrafluoropropane; 1,1,2,3,3-pentafluoropropane; and 1,1,1,3,3-pentafluoro-n-butane.

22. The process of claim 19 wherein said hydrohalocarbon blowing agent is hydrochlorofluorocarbon.

23. The process of claim 22 wherein said hydrochlorofluorocarbon blowing agent is 1-chloro-1,2-difluoroethane; 1-chloro-2,2-difluoroethane; 1-chloro-1,1-difluoroethane; 1,1-dichloro-1-fluoroethane; 1-chloro-1,1,2-trifluoroethane; 1-chloro-1,2,2-trifluoroethane; 1,1-dichloro-1,2-difluoroethane; 1-chloro-1,1,2,2-tetrafluoroethane; 1-chloro-1,2,2,2-tetrafluoroethane; 1,1-dichloro-1,2,2-trifluoroethane; 1,1-dichloro-2,2,2-trifluoroethane; 1,2-dichloro-1,1,2-trifluoroethane; mixtures of 1,1-dichloro-1-fluoroethane and 1,1-dichloro-2,2,2-trifluoroethane; and mixtures of 1,1-dichloro-2,2,2-trifluoroethane and 1,2-dichloro-1,2,2-trifluroethane.

24. The process of claim 16 wherein said haloalkenes include 1-chloro-1-fluoroethylene; 1,1-dichloroethylene; and 1,1-dichloro-2,2-difluoroethylene.

25. The process of claim 16 wherein said at least one additive is additive selected from the group consisting of esters, organic acids, anhydrides, aminoacids, ammonium salts, bromoalkanes, bromoalcohols, bromoaromatic esters, chloroalcohols, nitroalkanes, nitroalcohols, triarylmethyl chlorides, triarylmethyl bromides, 3-sulfolene, zinc dialkyldithiophosphate, sulfonate esters, haloalkyl phosphate esters, carbon molecular sieves, activated carbon, and zeolite molecular sieves.

26. The process of claim 16 wherein said at least one additive is present in an amount up to about 10 parts by weight per hundred parts of said polyol.

27. The process of claim 16 wherein said at least one additive is additive selected from the group consisting of esters, organic acids, anhydrides, aminoacids, ammonium salts, bromoalkanes, bromoalcohols, chloroalcohols, nitroalkanes, nitroalcohols, triarylmethyl chlorides, triarylmethyl bromides, 3-sulfolene, zinc dialkyldithiophosphate, haloalkyl phosphate esters, carbon molecular sieves, activated carbon, zeolite molecular sieves, sulfonate esters, and chloroalkyl phosphates.

28. The process of claim 16 wherein said at least one additive is additive selected from the group consisting of bromoalkanes, bromoalcohols, chloroalcohols, and nitroalkanes.

29. The process of claim 16 wherein at least two additives are present.

30. The process of claim 29 wherein said second additive is selected from the group consisting of nitroalkanes; bromoalkanes; bromoalcohols; chloroalcohols; and di(hydroxyalkyl)esters of tetrabromophthalic acid.

31. The composition of claim 1 wherein said hydrohalocarbon blowing agent is 1,1-dichloro-1-fluoroethane.

32. The composition of claim 1 wherein said additive is nitromethane.

33. The composition of claim 1 wherein said additive is 2,2,2-trichloroethanol.

34. The composition of claim 1 wherein said hydrohalocarbon blowing agent is 1,1-dichloro-1-fluoroethane and said additive is nitromethane.

35. The composition of claim 1 wherein said hydrohalocarbon blowing agent is 1,1-dichloro-1-fluoroethane and said additive is 2,2,2-trichloroethanol.

36. The composition of claim 2 wherein said hydrohalocarbon blowing agent is 1,1-dichloro-1-fluoroethane.

37. The composition of claim 2 wherein said additive is nitromethane.

38. The composition of claim 2 wherein said additive is 2,2,2-trichloroethanol.

39. The composition of claim 2 wherein said hydrohalocarbon blowing agent is 1,1-dichloro-1-fluoroethane and said additive is nitromethane.

40. The composition of claim 2 wherein said hydrohalocarbon blowing agent is 1,1-dichloro-1-fluoroethane and said additive is 2,2,2,-trichloroethanol.

41. The composition of claim 3 wherein said hydrohalocarbon blowing agent is 1,1-dichloro-1-fluoroethane.

42. The composition of claim 3 wherein said additive is nitromethane.

43. The composition of claim 3 wherein said additive is 2,2,2-trichloroethanol.

44. The composition of claim 3 wherein said hydrohalocarbon blowing agent is 1,1-dichloro-1-fluoroethane and said additive is nitromethane.

45. The composition of claim 3 wherein said hydrohalocarbon blowing agent is 1,1-dichloro-1-fluoroethane and said additive is 2,2,2-trichloroethanol.

* * * * *